(12) United States Patent
Feng et al.

(10) Patent No.: US 10,472,243 B2
(45) Date of Patent: Nov. 12, 2019

(54) INDUSTRIAL METHOD FOR PREPARING LARGE-SIZED GRAPHENE

(71) Applicants: SU-ZHOU CSTAR MATERIAL TECHNOLOGY CO.,LTD, Suzhou (CN); Chaoyang Feng, Suzhou (CN); Dongchun Xu, Suzhou (CN)

(72) Inventors: Chaoyang Feng, Suzhou (CN); Dongchun Xu, Suzhou (CN)

(73) Assignee: SU-ZHOU CSTAR MATERIAL TECHNOLOGY CO., LTD, Suzhou (CN)

(*) Notice: Subject to any disclaimer, the term of this patent is extended or adjusted under 35 U.S.C. 154(b) by 0 days.

(21) Appl. No.: 15/763,111

(22) PCT Filed: Oct. 23, 2015

(86) PCT No.: PCT/CN2015/092603
§ 371 (c)(1),
(2) Date: Aug. 31, 2018

(87) PCT Pub. No.: WO2017/049693
PCT Pub. Date: Mar. 30, 2017

(65) Prior Publication Data
US 2019/0023577 A1    Jan. 24, 2019

(30) Foreign Application Priority Data
Sep. 25, 2015 (CN) .................. 2015 1 0621739

(51) Int. Cl.
*C01B 32/225* (2017.01)
*C01B 32/194* (2017.01)

(52) U.S. Cl.
CPC .......... *C01B 32/225* (2017.08); *C01B 32/194* (2017.08); *C01P 2004/02* (2013.01); *C01P 2004/03* (2013.01); *C01P 2004/61* (2013.01)

(58) Field of Classification Search
CPC . C01B 32/225; C01B 32/194; C01P 2004/02; C01P 2004/03; C01P 2004/61
See application file for complete search history.

(56) References Cited

U.S. PATENT DOCUMENTS

2015/0071844 A1    3/2015    Kim et al.

FOREIGN PATENT DOCUMENTS

| CN | 102452649 A | 9/2010 |
|---|---|---|
| CN | 102452649 A | 5/2012 |

(Continued)

OTHER PUBLICATIONS

English machine translation of CN104163417A.*

(Continued)

*Primary Examiner* — Richard M Rump
(74) *Attorney, Agent, or Firm* — Zhihua Han

(57) ABSTRACT

A method for industrially manufacturing large-size graphene comprises following steps: (1) mixing graphite and concentrated sulfuric acid to obtain a mixed liquid, and ultrasonically treating the mixed liquid to obtain an upper layer of graphene and a lower layer of concentrated sulfuric acid liquid under condition that a chemical intercalation and a mechanical stripping were performed simultaneously; (2) separating the upper layer of graphene and the lower layer of concentrated sulfuric acid liquid; (3) the graphene separated in the step (2) being washed with water, filtered, and dried to obtain a large-size graphene. The method has the advantages of good peeling effect, great graphene size, repeated use of sulfuric acid as an intercalating agent, environment-friendliness, resource saving and wide industrial application prospect.

10 Claims, 2 Drawing Sheets

(56) References Cited

FOREIGN PATENT DOCUMENTS

| | | | |
|---|---|---|---|
| CN | 103539110 A | | 1/2014 |
| CN | 103833008 A | | 6/2014 |
| CN | 103910354 A | * | 7/2014 |
| CN | 103910354 A | | 7/2014 |
| CN | 104495810 A | | 4/2015 |
| JP | 60264316 A | | 12/1985 |

OTHER PUBLICATIONS

Li, Jihui, Jing Li, and Mei Li. "Preparation of expandable graphite with ultrasound irradiation." Materials Letters 61.28 (2007): 5070-5073.*

* cited by examiner

INDUSTRIAL METHOD FOR PREPARING LARGE-SIZED GRAPHENE

BACKGROUND OF THE INVENTION

1. Field of the Invention

The present invention relates to a graphene manufacturing method, and more particularly to a method of industrially manufacturing large-size graphene.

2. Description of Related Arts

Graphene is a new type of planar two-dimensional carbon material with unique structural characteristics and excellent mechanical, electrical, optical and thermal properties. Graphene has a wide range of application prospects in nano-electronic devices, energy storage materials, catalysis, sensors, drug carriers, and functional compounds materials. In addition, graphene has great application prospects in bioengineering and medical fields, including targeted drug delivery, cell imaging, biological detection, and tumor treatment. However, the existing technology and the cost of manufacturing graphene limit the applications and developments of graphene.

In general, there are two methods of manufacturing graphene as following: (1) a stripping method that separates graphene from natural graphite; (2) a chemical manufacturing method based on carbon-containing compounds. Therefore, at present, there are four major methods for manufacturing graphene: the modified Hummer method (chemically reduced graphene oxide method), the CVD method (chemical vapor deposition method), the crystal epitaxial growth method, and the micro mechanical peeling method.

(1) The chemical reduction graphene oxide method: after the graphite acid is intercalated, an oxidant is used to manufacture the graphene sheet into graphene oxide, then the graphene oxide is stripped in water, and the graphene is obtained through chemical reduction or thermal reduction. This method is a classical method for manufacturing graphene, and it is considered to be an important method that can realize the industrialization of graphene. However, due to the strong redox process, the conjugated structure of graphene may be greatly damaged, which affects its physicochemical properties. In addition, the oxidation of graphite during this process requires high temperatures, and the reduction process also uses hydrazine and other toxic substances. Therefore, the method has long manufacturing process, large energy consumption, low efficiency, low product yield, high cost, high treatment recovery cost, and environmental pollution. A large amount of waste chemicals will be generated in the manufacturing process.

(2) Chemical Vapor Deposition (CVD) method: through using carbon-containing organic substances such as methane, ethane and other gaseous carbon-containing compounds is manufactured by catalytic growth on a substrate such as copper or nickel in a high-temperature inert atmosphere such as hydrogen or argon. This method can produce high quality and large area monolayer graphene. However, the production conditions of the CVD method are severe, large energy consumption, low yield, and high cost, and the industrial demand for the amount of graphene cannot be satisfied. However, it is still promising for high added value products such as electronics and biology.

(3) Silicon carbide epitaxial growth method: through heating a silicon carbide single crystal at a high temperature, the Si located at the surface is etched at a relatively high temperature, and the remaining carbon atoms have the opportunity to recombine to form graphene. Graphene produced by this method has relatively high quality. However, the graphene manufactured by this method is mostly a mixture of single layers and multiple layers, and the linkage between the substrate and the generated graphene cannot be completely controlled, so that the manufactured graphene and the silicon carbide-based matrix are not easily separated and transferred. In addition, this method also has the disadvantages of large energy consumption, low output, high cost and difficulty in scale production.

(4) Micro mechanical peeling method: the graphene sheets were peeled off from the graphite state with a certain mechanical force, thereby the manufactured graphene have less defects. There are currently four types of micromechanical stripping methods: (i) The "Separation of tapes" method, A. Geim and KS. Novoselov received the Nobel Prize for manufacturing the world's first monolayer graphene using this method. This method is to repeatedly peel the graphite sheet with adhesive tape, then transfer the obtained graphene to the silicon wafer, dissolve the tape with acetone, and manufacture a single-layer graphene. This method can produce large-size graphene, but the yield is low, and it is impossible to achieve large-scale production, especially for large industrialization. (ii) Liquid phase exfoliation: the graphite is subjected to exfoliation by ultrasonically direct exfoliation in a liquid phase system, or by ball milling. Ultrasonic peeling is generally performed in an organic solvent such as N-methyl-2-pyrrolidone, or in an aqueous solution containing a surfactant, and the graphite sheet is subjected to ultrasonication for a long period of time, so that monolayers and a few layers of graphene can be manufactured. One is to grind the graphite powder by long-time ball milling to manufacture graphene by wet ball milling in an organic solvent. Ultrasonic and ball milling peeling, due to the use of organic solvents or surfactants, it is difficult to completely remove the organic solvent and surfactant after separation, and the separated graphene and incompletely separated graphite flakes are in organic solvents or surfactants. Not easily separated, these problems affect the quality and application of graphene, while the cost of removing organic solvents and surfactants is very high. (iii) Roller stripping method: inspired by the ball-milling stripping and tape stripping technology, the three-roller-rolled roll is used for graphene stripping. The specific process is to dissolve the macromolecule material in an organic solvent to manufacture an adhesive, and the mechanical pressure through the three-roller is graphite. Grinding and dispersion were performed, and then the graphene was peeled off layer by layer by the "tape stripping method" for manufacturing graphene, thereby obtaining graphene. Due to the manufactured graphene, it is necessary to use a large amount of organic solvents such as acetone, tetrahydrofuran, cyclohexanone, etc., or high-temperature heating to remove the polymer adhesive, which is costly and pollutes the environment. Its industrialization and large-scale production and application still have problems. The Chinese Patent Application Publication No. CN104495810A entitled "Green method for large-scale production of graphene" is still a graphene peeling technology based on a roll technology basis, and the separated graphene and the separated graphene in the roll press technology. The separation of insufficient graphite is still a big problem. Due to the use of a water-based adhesive, the problem of some organic solvents is avoided, but the quality of the separated graphene and subsequent environmental protection still have problems to be solved. (iv) Solid Particle Assisted Mechanical Stripping Method: Chinese Patent Application Publication No. CN101817516A discloses a method for high-efficiency and low-cost mechanical stripping of graphene or graphene oxide by using a robot to assist a large amount of the tiny solid particles were stripped from the graphite sheet and the design was simulated by ball milling. The solid particles were used to shear and impact the graphite material, and it was expected that the contact area and the number of peelings of the graphite peeling would be increased. The method provided by the invention is complex and uses a lot of organic solvents, so the subsequent pollution environment limits the large-scale production of this technology in industry.

Due to its excellent physicochemical properties, graphene has great application prospects and needs in the fields of energy, chemical industry, materials, biotechnology, aerospace, and electric vehicles. Therefore, manufacturing graphene method with low cost, high yield, and no pollution need to be developed. New methods for manufacturing graphene that can be produced in large scale become an urgent need for the industrialization of graphene.

SUMMARY OF THE INVENTION

In order to overcome the above problems in the prior art, the present invention provides a method for industrially manufacturing large-size graphene. The method has the advantages of low cost, good separation effect, environmental friendliness, large-scale production and large size of the manufactured graphene, and extremely good application prospect.

The method for industrially manufacturing large-size graphene comprising the following steps: (1) provide graphite and concentrated sulfuric acid to be mixed to obtain a mixed liquid (a), the mixed liquid is sonicated so that the chemical intercalation and the mechanical stripping are performed simultaneously, the mixed liquid is formed as an upper layer of graphene and a lower layer of concentrated sulfuric acid liquid (b), the concentrated sulfuric acid liquid contains unpeeled graphite; (2) dissociate the upper layer of graphene and the lower layer of concentrated sulfuric acid liquid; (3) the graphene dissociated in step (2) is washed with water, filtered, and dried to obtain a large-size graphene.

The method further includes a step (4) of returning the concentrated sulfuric acid liquid (b) separated in step (2) to step (1) for recycling.

Specifically, after the ultrasonic treatment, the graphene has been completely exfoliated floats on an upper layer of the liquid because the specific gravity is small, and the unpeeled or incompletely exfoliated graphite remains in the concentrated sulfuric acid liquid (b) in a lower layer due to the specific gravity is large. The concentrated sulfuric acid liquid (b) is returned to step (1) to be mixed with graphite and recycled for reuse. This not only recycles the sulfuric acid, but also avoids large amounts of waste acid, saves resources, and more friendly to environment. In addition, continuing the sonication, graphene can be stripped from the graphite that has not been completely exfoliated in the liquid, resulting in a higher yield.

Preferably, in the step (1), the mass to volume ratio of the graphite and the concentrated sulfuric acid in the mixed liquid (a) is 1:50~1:500 g/mL.

Preferably, the concentrated sulfuric acid has a mass concentration of 75%~98%.

Preferably, the graphite is selected from one or more of natural graphite, expandable graphite, highly oriented pyrolytic graphite and pyrolytic graphite.

Preferably, the ultrasonic treatment is 10 to 20 hours in step (1).

Preferably, the ultrasonic power of the ultrasonic treatment is 150~300 W in the step (1). In the present invention, the sulfuric acid is used as an intercalating agent, the graphite and sulfuric acid are mixed and under ultrasound mechanical stripping, a chemical intercalation and a mechanical stripping are performed simultaneously, and the stripping effect is good.

Preferably, the method also includes a step of standing the liquid after the ultrasonic treatment, and the standing time is 30 to 60 minutes.

After standing and separation, the peeled graphene floats on the upper layer, and the graphite, which has not been fully exfoliated, will precipitate in the lower layer of the liquid, and ultrasonic stripping can be continued until the graphite sheet is completely peeled off into graphene, so that the sulfuric acid can be reused repeatedly, saving Resources, graphite flakes are also basically completely stripped into graphene. Finally, it is impossible to peel the solid impurities contained in the graphite sheet, such as silicon, iron, and ash.

Preferably, in the step (2), the washing includes a step of washing with water of 60~90° C. for 2 to 4 times, and then washing with water of room temperature 10~30° C. for 2-3 times.

Preferably, the water used for washing is distilled water.

Preferably, in step (2), the drying temperature is 100 to 120° C. and the drying time is 6 to 10 hours.

Preferably, the length and the width of the large-size graphene manufactured by the method are 10~30 μm, more preferably 15~25 μm.

The length and width of the large-size graphene manufactured by the method of the present invention are generally greater than 10 μm, and the length and width of the large-size graphene are even more than 20 μm and up to 30 μm. The large-size graphene manufactured by this method can also be large scale production. Graphene stripped from natural graphite and currently reported by other techniques is generally less than 2 μm in size (length and width). Therefore, the present invention provides a method for manufacturing an industrializable large-size graphene with epoch-making significance. The graphene has a large size and can be industrially produced.

In the present invention, a high concentration of sulfuric acid and graphite are weighed in a certain proportion and ultrasonically exfoliated. The sulfuric acid is required as an intercalating agent for graphite stripping. By long-term ultrasonic stripping of a sulfuric acid bath, natural graphite flakes are effectively stripped. Since the peeled graphene becomes lighter due to its lighter specific gravity, it will float on the upper layer of the sulfuric acid liquid after the ultrasonic wave is stopped, and the graphene floating on the upper layer will be collected, and distilled water will be added for washing. The graphene that is not completely separated will remain in the light due to its heavy weight. The high-quality graphene will float on the water surface and be separated by washing. The upper graphene has a good quality. The remaining incompletely separated graphite can be reused for re-ultrasonic separation. The entire process is basically free of large amounts of acid emissions, and there is no production of waste acid due to the introduction of oxidants, thereby realizing an efficient, environmentally friendly, and large scale.

Beneficial Effects: the invention provides a method for industrially manufacturing large-size graphene. After the graphite and the concentrated sulfuric acid are mixed according to a certain proportion, the graphene with excellent quality floating on the upper layer is obtained through ultrasonic treatment, and the graphite that is not fully peeled sinks in the lower layer of the liquid to be reused for further ultrasonic stripping. The stripping effect of this method is good, the size of the graphene is large, and the sulfuric acid as an intercalation agent can be reused repeatedly, which saves resources, avoids waste acid emission, and is environmentally friendly. The method of the invention solves the problems of high cost, low efficiency, polluted environment and inability to industrialize large-scale production existing in the existing graphene production technology. In addition, the present invention provides a novel method for industrially manufacturing large-size graphenes, which is consistent with large-size graphenes manufactured by Nobel Prize winners.

Other objects, advantages and novel features of the invention will become more apparent from the following detailed description when taken in conjunction with the accompanying drawings.

DETAILED DESCRIPTION OF THE PREFERRED EMBODIMENT

Figure 1:
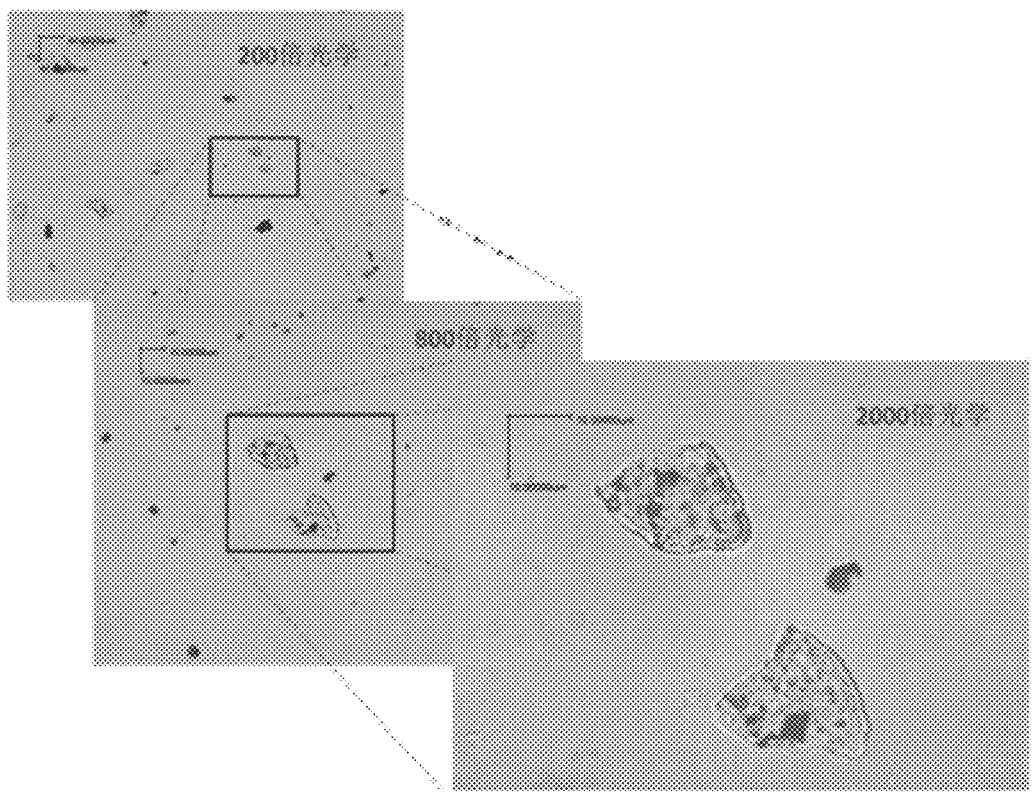
FIG. 1 is an optical microscope diagram of a large-sized graphene manufactured according to a first embodiment of the present invention.

Reference will now be made in detail to some preferred embodiments of the present invention.

The method for industrially manufacturing large-size graphene in a first embodiment includes the following steps:
(1) weigh 10 g natural graphite flakes and 1 L concentrated sulfuric acid with a concentration of 80% to be mixed to form a mixed liquid (a), wherein the ratio of the mass of graphite flakes relative to the volume of the concentrated sulfuric acid is 1:100 g/mL;
(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;
(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 120° C. and 6 hours to obtain 6.3 g of large-size graphene, and the large-size graphene of the first embodiment has a length more than 20 μm and a width more than 20 μm.
(4) the remaining concentrated sulfuric acid liquid (b) is returned to step (1) for recycling.

Second embodiment: the method for industrially manufacturing large-size graphene in a second embodiment includes the following steps:
(1) weigh 10 g natural graphite flakes and 1 L concentrated sulfuric acid with a concentration of 85% to be mixed to form a mixed liquid (a), wherein the ratio of the mass of graphite flakes relative to the volume of the concentrated sulfuric acid is 1:100 g/mL;
(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;
(3) the graphene floating on the upper layer is collected to be washed with 80° C. distilled water for 3 times, then the graphene is washed with normal temperature distilled water for twice, and then the graphene is vacuum-filtered; the graphene was dried in an air drying oven under 110° C. and 8 hours to obtain 7.2 g of large-size graphene, and the large-size graphene of the second embodiment has a length more than 18 μm and a width more than 18 μm.
(4) the remaining concentrated sulfuric acid liquid (b) is returned to step (1) for recycling.

Third embodiment: the method for industrially manufacturing large-size graphene in a third embodiment includes the following steps:
(1) weigh 10 g natural graphite flakes and 1 L concentrated sulfuric acid with a concentration of 98% to be mixed to form a mixed liquid (a), wherein the ratio of the mass of graphite flakes relative to the volume of the concentrated sulfuric acid is 1:100 g/mL;
(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;
(3) the graphene floating on the upper layer is collected to be washed with 80° C. distilled water for 3 times, then the graphene is washed with normal temperature distilled water for twice, and then the graphene is vacuum-filtered; finally, the graphene is dried in an air drying oven under 110° C. and 8 hours to obtain 7.5 g of large-size graphene, and the large-size graphene of the third embodiment has a length more than 20 μm and a width more than 20 μm.
(4) the remaining concentrated sulfuric acid liquid (b) is returned to step (1) for recycling.

Fourth embodiment: the method for industrially manufacturing large-size graphene in a fourth embodiment includes the following steps:
(1) weigh 10 g natural graphite flakes and 0.5 L concentrated sulfuric acid with a concentration of 80% to be mixed to form a mixed liquid (a), wherein the ratio of the mass of graphite flakes relative to the volume of the concentrated sulfuric acid is 1:50 g/mL;
(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 5.9 g of large-size graphene, and the large-size graphene of the first embodiment has a length more than 18 μm and a width more than 18 μm.

(4) the remaining concentrated sulfuric acid liquid (b) is returned to step (1) for recycling.

Fifth embodiment: the method for industrially manufacturing large-size graphene in a fifth embodiment includes the following steps:

(1) weigh 10 g natural graphite flakes and 0.5 L concentrated sulfuric acid with a concentration of 85% to be mixed to form a mixed liquid (a), wherein the ratio of the mass of graphite flakes relative to the volume of the concentrated sulfuric acid is 1:50 g/mL;

(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 20 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 6.8 g of large-size graphene, and the large-size graphene of the first embodiment has a length more than 18 μm and a width more than 18 μm.

(4) the remaining concentrated sulfuric acid liquid (b) is returned to step (1) for recycling.

Sixth Embodiment: the method for industrially manufacturing large-size graphene in a sixth embodiment includes the following steps:

(1) weigh 10 g natural graphite flakes and 1 L concentrated sulfuric acid with a concentration of 85% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 200 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 7.9 g of large-size graphene, and the large-size graphene of the first embodiment has a length more than 15 μm and a width more than 15 μm.

(4) the remaining concentrated sulfuric acid liquid (b) is returned to step (1) for recycling.

Seventh Embodiment: the method for industrially manufacturing large-size graphene in a seventh embodiment includes the following steps:

(1) weigh 10 g natural graphite flakes and 1 L concentrated sulfuric acid with a concentration of 85% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 300 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 8.1 g of large-size graphene, and the large-size graphene of the first embodiment has a length more than 15 μm and a width more than 15 μm.

(4) the remaining concentrated sulfuric acid liquid (b) is returned to step (1) for recycling.

Eighth embodiment: the method for industrially manufacturing large-size graphene in a eighth embodiment includes the following steps:

(1) weigh 10 g natural graphite flakes and 5 L concentrated sulfuric acid with a concentration of 85% to be mixed to form a mixed liquid (a), wherein the ratio of the mass of graphite flakes relative to the volume of the concentrated sulfuric acid is 1:500 g/mL;

(2) pour the mixed liquid (a) of graphite and concentrated sulfuric acid in an ultrasonic water to ultrasonically treat with an ultrasonic power of 300 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 7.2 g of large-size graphene, and the large-size graphene of the first embodiment has a length more than 15 μm and a width more than 15 μm.

(4) the remaining concentrated sulfuric acid liquid (b) is returned to step (1) for recycling.

Ninth embodiment: the method for industrially manufacturing large-size graphene in a ninth embodiment includes the following steps:

(1) weigh 10 g natural graphite flakes and 1 L concentrated sulfuric acid with a concentration of 85% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 200 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 7.6 g of large-size graphene, and the large-size graphene of the first embodiment has a length more than 15 μm and a width more than 15 μm.

(4) the remaining concentrated sulfuric acid liquid (b) is returned to step (1) for recycling.

Tenth embodiment: the method for industrially manufacturing large-size graphene in a tenth embodiment includes the following steps:

(1) weigh 10 g natural graphite flakes and 1 L concentrated sulfuric acid with a concentration of 80% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 60 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 110° C. and 8 hours to obtain 6.0 g of large-size graphene, and the large-size graphene of the first embodiment has a length more than 25 μm and a width more than 25 μm.

(4) the remaining concentrated sulfuric acid liquid (b) is returned to step (1) for recycling.

Eleventh embodiment: the method for industrially manufacturing large-size graphene in a eleventh embodiment includes the following steps:

(1) weigh 10 g natural graphite flakes and 1 L concentrated sulfuric acid with a concentration of 80% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 60° C. distilled water for 3 times, then the graphene is washed with normal temperature distilled water for twice, and then the graphene is vacuum-filtered; finally, the graphene was dried in an air drying oven under 110° C. and 8 hours to obtain 6.4 g of large-size graphene, and the large-size graphene of the first embodiment has a length more than 20 μm and a width more than 20 μm.

(4) the remaining concentrated sulfuric acid liquid (b) is returned to step (1) for recycling.

Twelfth embodiment: the method for industrially manufacturing large-size graphene in a twelfth embodiment includes the following steps:

(1) weigh 10 g natural graphite flakes and 1 L concentrated sulfuric acid with a concentration of 80% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 90° C. distilled water for 3 times, then the graphene is washed with normal temperature distilled water for twice, and then the graphene is vacuum-filtered; finally, the graphene was dried in an air drying oven under 110° C. and 8 hours to obtain 6.25 g of large-size graphene, and the large-size graphene of the first embodiment has a length more than 20 μm and a width more than 20 μm.

(4) the remaining concentrated sulfuric acid liquid (b) is returned to step (1) for recycling.

Thirteenth embodiment: the method for industrially manufacturing large-size graphene in a thirteenth embodiment includes the following steps:

(1) weigh 10 g natural graphite flakes and 1 L concentrated sulfuric acid with a concentration of 80% to be mixed to form a mixed liquid (a), wherein the ratio of the mass of graphite flakes relative to the volume of the concentrated sulfuric acid is 1:100 g/mL;

(2) pour the mixed liquid (a) of graphite and concentrated sulfuric acid in an ultrasonic water to ultrasonically treat with an ultrasonic power of 150 W, ultrasonic peeling is performed under the conditions of acid intercalation, the continuous expansion of the graphite sheet is observed during ultrasonic peeling, and ultrasonic peeling is stopped after 10 hours of continuous ultrasound; after standing for 30 minutes, the stripped graphene floats on the surface of the sulfuric acid liquid, so there are an upper layer of graphene and a lower layer of concentrated sulfuric acid liquid (b); the concentrated sulfuric acid liquid (b) contains incompletely exfoliated graphite flakes;

(3) the graphene floating on the upper layer is collected to be washed with 80° C. distilled water for 3 times, then the graphene is washed with normal temperature distilled water for twice, and then the graphene is vacuum-filtered; finally, the graphene was dried in an air drying oven under 100° C. and 10 hours to obtain 6.5 g of large-size graphene, and the large-size graphene of the first embodiment has a length more than 30 μm and a width more than 30 μm.

(4) the remaining concentrated sulfuric acid liquid (b) is returned to step (1) for recycling.

Figure 2:
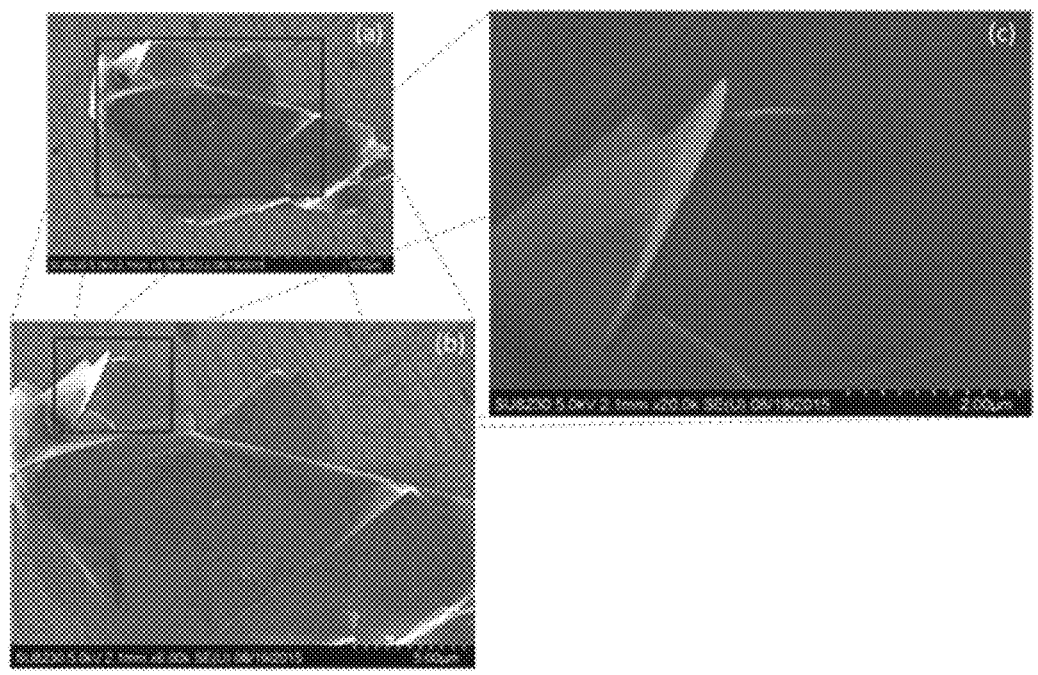
FIG. 2 is a scanning electron micrograph of a large-size graphene manufactured according to the first embodiment of the present invention.

FIGS. 1-2 respectively show an optical micrograph and a scanning electron microscope (SEM) of a large-size graphene manufactured according to the first embodiment of the present invention.

Specifically, FIG. 1 shows photographs of large-size graphene manufactured in the first embodiment taken at 200×, 800×, and 2000× optical microscopes. As can be seen from the 200× optical micrograph, after the ultrasonic stripping according to the present invention, the graphite sheet is completely peeled off into graphene with a scale of 50 μm. From the 800× optical micrograph, it can be clearly seen that the graphite sheet was completely peeled off into graphene, and the scale is 10 μm. From the 2,000× optical micrographs, it can be more clearly seen that the graphite sheet is completely peeled off into graphene with a scale of 10 μm. The size of graphene manufactured by the prior art is generally less than several square micrometers, which is difficult to observe with an optical microscope. As can be seen from FIG. 1, the graphene manufactured by the method of the present invention has the characteristics of large size and sufficient peeling, which can be observed by an optical microscope and is consistent with the size of the graphene manufactured by the Nobel Prize winner using the tape stripping method. The method of the present invention can produce large-scale graphene with large scale, no pollution and high efficiency.

FIG. 2 shows a scanning electron microscope (SEM) image of the large-size graphene manufactured in the first embodiment 1. From the graph (a), it can be seen that the graphite is peeled off into graphene with a scale of 10 μm. It can be clearly seen from the graph (b) that the graphite is completely peeled off into graphene with a scale of 5 μm. From the graph (c), it can be seen more clearly that graphene is a single layer, and the substrate can be clearly identified by the graphene, wherein the scale is 2 μm. FIG. 2 again confirms that the graphene manufactured by the method of the present invention has the characteristics of large size and sufficient peeling. The large-size graphene manufactured by the present invention is consistent with the size of the graphene manufactured by the tape stripping method by the Nobel laureate. At present, there is no report on the industrial methods for manufacturing such a large-size graphene, and it is difficult to obtain a SEM photograph of such a high-quality graphene in the existing method in a range of 10 micrometers. The SEM photograph of FIG. 2 further confirms the great advantages of the industrially manufactured graphene method of the present invention.

The method of the invention uses the sulfuric acid intercalation layer to manufacture the large-size graphene by ultrasonic micro-mechanical graphite stripping, and solves some problems that cannot be solved in the prior art: for example, manufacturing graphene requires a large amount of acid and oxidant, and a large amount of wastewater needs subsequent processing.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for industrially manufacturing large-size graphene comprising following steps:
   (1) mixing graphite and concentrated sulfuric acid to obtain a mixed liquid, and ultrasonically treating the mixed liquid to obtain an upper layer of graphene and a lower layer of concentrated sulfuric acid liquid under condition that a chemical intercalation and a mechanical stripping were performed simultaneously;
   (2) separating the upper layer of graphene and the lower layer of concentrated sulfuric acid liquid;
   (3) the graphene separated in the step (2) being washed with water, filtered, and dried to obtain a large-size graphene.

2. The method for industrially manufacturing large-size graphene as recited in claim 1, further comprising a step (4) of returning the concentrated sulfuric acid liquid separated in step (2) to step (1) for recycling.

3. The method for industrially manufacturing large-size graphene as recited in claim 1, wherein the mass to volume ratio of the graphite relative to the concentrated sulfuric acid of the mixed liquid is 1:50~1:500 g/mL in the step (1).

4. The method for industrially manufacturing large-size graphene as recited in claim 1, wherein the mass concentration of the concentrated sulfuric acid is 75%~98%.

5. The method for industrially manufacturing large-size graphene as recited in claim 1, wherein the graphite is selected from at least one of natural graphite, expandable graphite, highly oriented pyrolytic graphite and pyrolytic graphite.

6. The method for industrially manufacturing large-size graphene as recited in claim 1, wherein the ultrasonic treatment time is 10~20 hours and the ultrasonic power is 150~300 W in the step (1).

7. The method for industrially manufacturing large-size graphene as recited in claim 1, wherein after the ultrasonic treatment, the method further comprises a step of standing, and the standing time is 30~60 minutes.

8. The method for industrially manufacturing large-size graphene as recited in claim 1, wherein the washing process of step (3) comprises steps of washing with 60~90° C. water for 2~4 times, and then washing with 10~30° C. water for 2~3 times.

9. The method for industrially manufacturing large-size graphene as recited in claim 1, wherein the drying temperature of step (3) is 100~120° C., and the drying time is 6~10 hours.

10. The method for industrially manufacturing large-size graphene as recited in claim 1, wherein the length of the large-size graphene is 10~30 μm, and the width of the large-size graphene is 10~30 μm.

* * * * *